United States Patent
Carroll

(10) Patent No.: US 10,023,275 B2
(45) Date of Patent: Jul. 17, 2018

(54) SELECTIVELY DEPLOYABLE FIN SYSTEM FOR WATERCRAFT AND METHOD OF USE

(71) Applicant: Mark Carroll, Newport Beach, CA (US)

(72) Inventor: Mark Carroll, Newport Beach, CA (US)

( * ) Notice: Subject to any disclaimer, the term of this patent is extended or adjusted under 35 U.S.C. 154(b) by 0 days.

(21) Appl. No.: 15/550,027

(22) PCT Filed: Mar. 7, 2016

(86) PCT No.: PCT/US2016/021268
§ 371 (c)(1),
(2) Date: Aug. 10, 2017

(87) PCT Pub. No.: WO2016/144913
PCT Pub. Date: Sep. 15, 2016

(65) Prior Publication Data
US 2018/0043974 A1  Feb. 15, 2018

Related U.S. Application Data

(60) Provisional application No. 62/130,179, filed on Mar. 9, 2015.

(51) Int. Cl.
*B63B 35/79*  (2006.01)
*B63B 1/30*  (2006.01)
(Continued)

(52) U.S. Cl.
CPC ......... *B63B 35/7926* (2013.01); *F16H 21/12* (2013.01); *F16H 35/14* (2013.01)

(58) Field of Classification Search
CPC .......... B63B 1/30; B63B 35/73; B63B 35/79; B63B 35/7926; B63B 3/38; B63B 1/28; B63B 41/00; F16H 21/12
(Continued)

(56) References Cited

U.S. PATENT DOCUMENTS 2,593,806 A * 4/1952 Steele ................. B63B 35/7926
114/132
3,087,173 A * 4/1963 Meyer .................... B63B 35/81
114/132
(Continued)

FOREIGN PATENT DOCUMENTS

WO  2012009753 A1  1/2012
WO  2013010013 A1  1/2013

OTHER PUBLICATIONS

PCT/US2016/021268 International Search Report and Written Opinion; International Preliminary Report on Patentability.

*Primary Examiner* — Anthony D Wiest
(74) *Attorney, Agent, or Firm* — Joseph G. Chu; JCIP

(57) ABSTRACT

The present application is directed to a selectively deployable fin system which includes at least one housing positioned within a body of a standup paddleboard, the housing defining at least one housing passage therein, at least one actuator is positioned within the housing. The actuator is configured to be operable by a user positioned on the standup paddleboard or similar watercraft during use. At least one linkage system, in communication with the actuator, is positioned within the housing. In addition, at least one fin is in communication with the actuator via the linkage device. The fin is configured to be selectively positioned within the housing in a retracted configuration and selectively extending from the housing in a deployed configuration.

22 Claims, 10 Drawing Sheets

(51) Int. Cl.
*F16H 35/14* (2006.01)
*F16H 21/12* (2006.01)

(58) Field of Classification Search
USPC .......................................................... 114/282
See application file for complete search history.

(56) References Cited

U.S. PATENT DOCUMENTS

| | | | | |
|---|---|---|---|---|
| 4,100,870 A | * | 7/1978 | Prade | B63B 7/04 |
| | | | | 114/352 |
| 4,805,546 A | | 2/1989 | Geller et al. | |
| 4,883,436 A | * | 11/1989 | Oakland | B63B 35/7926 |
| | | | | 114/132 |
| 5,129,344 A | * | 7/1992 | Ono | B63B 35/7926 |
| | | | | 114/127 |
| 5,224,435 A | | 7/1993 | Kinnaird | |
| 5,356,324 A | * | 10/1994 | Cunningham | B63B 35/7926 |
| | | | | 441/71 |
| 6,524,146 B2 | | 2/2003 | Spade et al. | |
| 9,067,653 B2 | * | 6/2015 | Green | B63B 35/7926 |
| 2013/0237107 A1 | * | 9/2013 | Mears | B63B 35/7926 |
| | | | | 441/79 |

* cited by examiner

SELECTIVELY DEPLOYABLE FIN SYSTEM FOR WATERCRAFT AND METHOD OF USE

CROSS REFERENCE TO RELATED APPLICATIONS

The present application claims priority to U.S. Provisional Patent Application Ser. No. 62/130,179, entitled "Stand Up Paddleboard Having Improved Tracking and Stability," filed on Mar. 9, 2015, the entire contents of which is hereby incorporated by reference in its entirety herein.

BACKGROUND

Paddleboards, surfboards, kayaks, waveskis and the like have been used for many years as rescue and lifesaving devices and as platforms for other activities such as scuba diving, fishing, paddling, surfing, kayaking and the like. Typically, the user lies on the surfboard or paddleboard in a prone position and paddles the paddleboard using his/her arms. In recent years, the popularity of standup paddleboards (hereinafter SUPs) has exploded due to the ease of learning and more comfortable paddling position as compared to conventional paddleboards. When using a SUP the user stands erect and propels the SUP using a paddle. As such, the user has a greater mechanical advantage and can traverse greater distances more efficiently and more comfortably using a SUP as compared with a conventional paddleboard.

Generally, surfboards, paddleboards, SUPs, body boards, waveskis, kayaks, and the like employ at least one fin or similar device to aid in enhancing device stability and permit efficient tracking and control. FIGS. 1-3 shows various views of a prior art SUP. As shown, the SUP 1 includes a body 3 having a first surface 5 and a second surface 9. Optionally, the first surface 5 may include one or more traction devices or pads 7 positioned thereon. Further, the SUP 1 includes a fin box 11 having a fin 13 positioned therein. As shown, the fin box 11 and fin 13 are located proximate to the tail 15 of the SUP 1. While prior art fin systems used on surfboards, SUPs, and the like have proven useful in the past a number of shortcomings have been identified. For example, the user may wish to change some characteristics of the fin 13 during use to overcome changes in environmental conditions, overcome impediments to travel, enhance the stability of the watercraft and the like. Unfortunately, prior art fin systems are largely fixed once the fin 13 is installed on the surfboard, SUP kayak, or similar watercraft. As such, the user cannot easily vary the length, angle, or other characteristic of the fin 13 during use.

In light of the foregoing, there is an ongoing need for a fin system for use with SUPS, surfboards, body boards, kayaks, waveskis and similar watercraft which enables the user to easily and quickly vary characteristics of the fin during use.

SUMMARY

The present application is directed to a selectively deployable fin system for a standup paddleboard, surfboard or similar watercraft. More specifically, the selectively deployable fin system includes at least one housing positioned within a body of a standup paddleboard, the housing defining at least one housing passage therein. At least one actuator is positioned within the housing. The actuator is configured to be operable by a user positioned on the standup paddleboard or similar watercraft during use. At least one linkage system, in communication with the actuator, is positioned within the housing. In addition, at least one fin is in communication with the actuator via the linkage system. The fin is configured to be selectively positioned within the housing in a retracted configuration and selectively extending from the housing in a deployed configuration.

In another embodiment, the present application discloses a selectively deployable fin system for use with a watercraft which includes at least one housing positioned within a body of a watercraft, the housing defining at least one housing passage therein. At least one actuator, configured to be operable by a user positioned on the watercraft, is positioned within the housing. At least one linkage system is in communication with the actuator. Further, at least one fin is in communication with the actuator via the linkage system. The fin may be configured to be selectively positioned within the housing in a retracted configuration and selectively extended from the housing in a deployed configuration.

Other features and advantages of the embodiments of a selectively deployable fin system as disclosed herein will become apparent from a consideration of the following detailed description.

BRIEF DESCRIPTION OF THE DRAWINGS

Various embodiments of a selectively deployable fin system will be explained in more detail by way of the accompanying drawings, wherein.

DESCRIPTION

Figure 1:
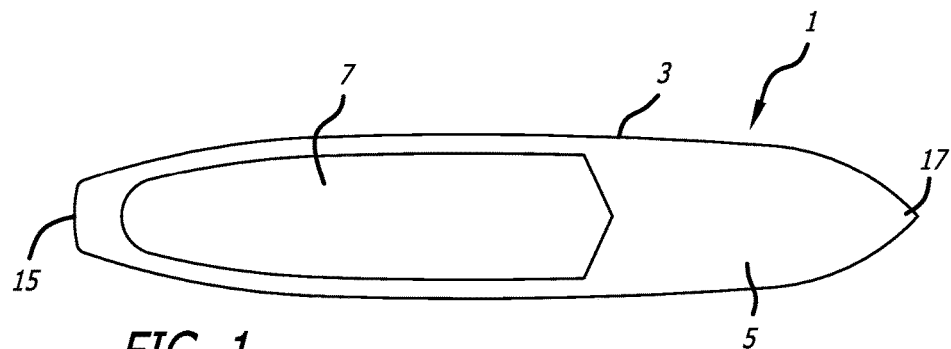
FIG. 1 shows a planar view of the top surface of a prior art SUP.
Figure 2:
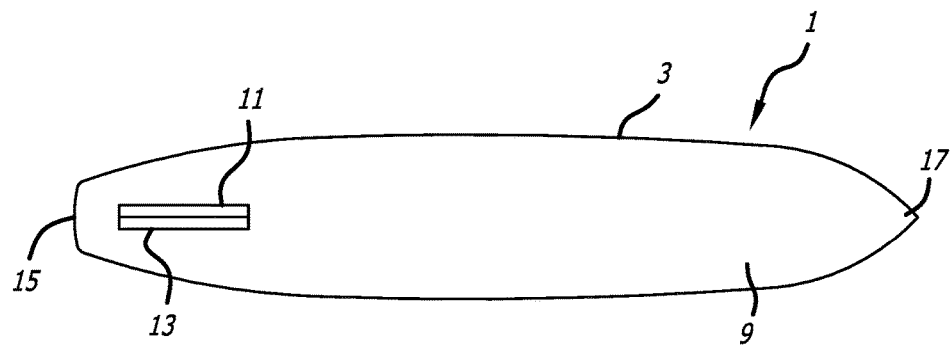
FIG. 2 shows a planar view of the bottom surface of a prior art SUP.
Figure 3:
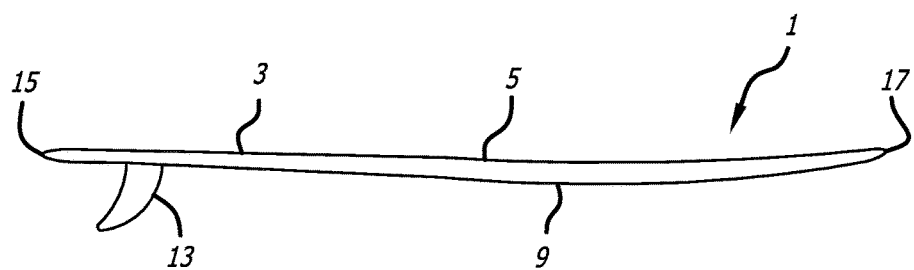
FIG. 3 shows a side view of a prior art SUP.
Figure 4:
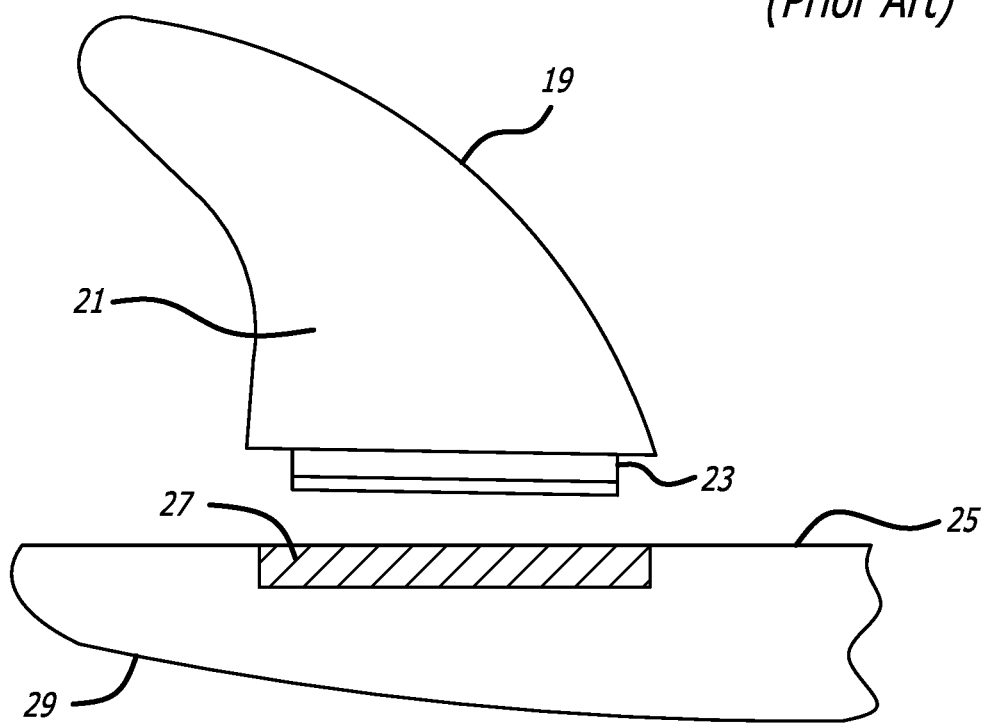
FIG. 4 shows a side view of a prior art fin system utilizing a removable fin positioned within a fin box affixed to a SUP.
Figure 5:
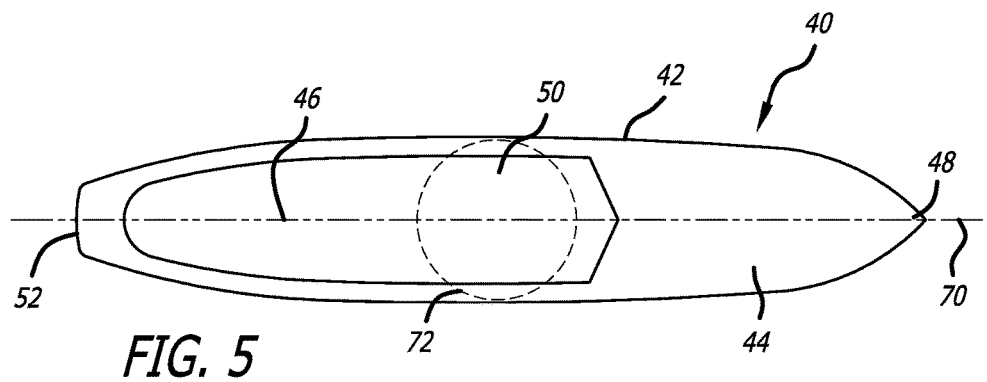
FIG. 5 shows a planar view of the top surface of a SUP having improved tracking and stability.
Figure 6:
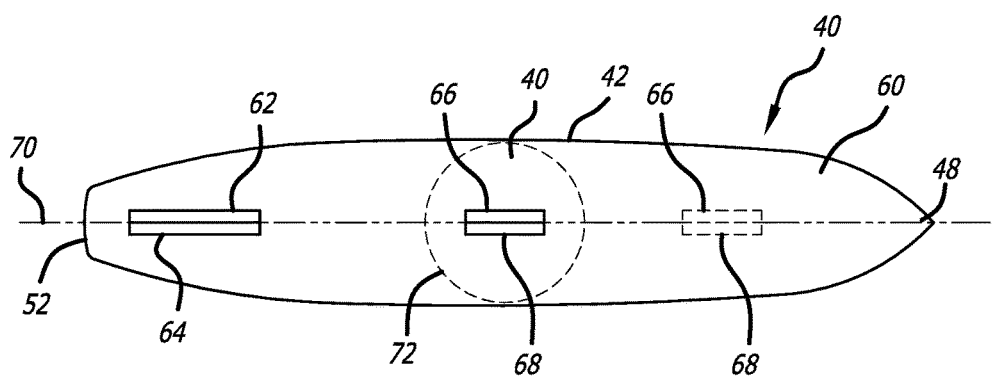
FIG. 6 shows a planar view of the bottom surface of an embodiment of a SUP having improved tracking and stability.
Figure 7:
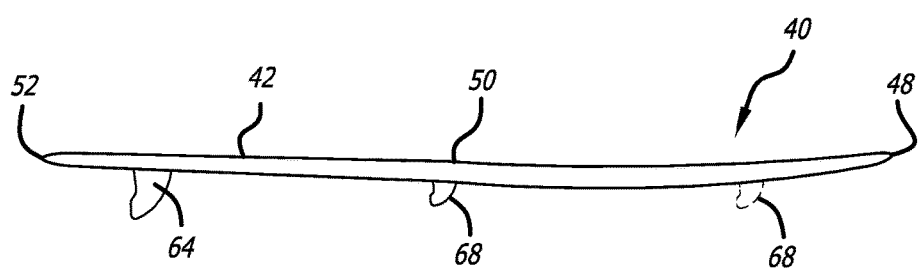
FIG. 7 shows a side view of a SUP having improved tracking and stability.

FIGS. 5-7 show various views of an embodiment of a SUP having improved tracking and stability as compared with prior art devices. As shown, the SUP 40 comprises a SUP body 42 having a first surface 44 and a second surface 60. The body 42 includes a nose 48, a tail 52, and a medial portion 50 positioned between the nose 48 and the tail 52. In one embodiment, the SUP body 42 is manufactured from one or more foam materials including, without limitations, polystyrene, polyester, polyurethane, polystyrene, Varial™ foam, closed cell foam, open cell foam, and the like. In another embodiment, the SUP body 42 may be constructed from a honeycomb material, composite materials, epoxies, wood fibers, grass fibers (i.e. bamboo, etc.), polymers, plastics, rubbers, alloys, papers, cardboard, impregnated materials, and the like. Optionally, the SUP body 42 may be constructed from one or more polymers and may comprise an inflatable body or structure. In another embodiment, the SUP body 42 comprises one or more foam materials encased within one or more protective materials. Exemplary protective materials include, without limitations, fiberglass, polymers, polystyrene, polyurethane, polyvinyl chloride (PVC), wood fibers, grass fibers (i.e. bamboo, etc.), epoxies, composite materials, and the like. In the illustrated embodiment at least one traction device or pad 46 is positioned on the first surface 44 of the body 42, proximate to the medial position 50 and tail 52. Optionally, the SUP 40 may not include a traction device 46 on the first surface 44 of the body 42.

Referring again to FIGS. 5-7, the SUP 40 includes a first fin box or fin retaining system 62 (hereinafter first fin box 62) and at least a second fin box 66 on the second surface 60 of the body 42. The first fin box 62 may be positioned proximate to the tail 52 of the body 42 and may be configured to secure at least a first fin 64 therein. For example, in one embodiment the first fin box 62 is positioned as close to the tail 52 of the body 42 of the SUP 40 as manufacturable while maintaining the structural strength of the body 42. In another embodiment, the first fin box 62 is positioned between the medial portion 50 and the tail 52 of the body 42. In one embodiment, the first fin box 62 may be configured to support a single fin 64 therein. In an alternate embodiment, the first fin box 62 may be configured to support multiple fins therein. As shown in FIG. 6, the first fin box 62 securing the first fin 64 may be positioned along the longitudinal center line 70 of the SUP 40. Optionally, the position of the first fin box 62 may be displaced from the longitudinal center line 70 of the SUP 40.

As shown in FIGS. 5-7, at least a second fin box or fin retaining system 66 (hereinafter second fin box 66) is positioned on the second surface 60 of the body 42. In the illustrated embodiment, the second fin box 66 is positioned proximate to the medial portion 50 of the body 42. For example, in one embodiment the second fin box 66 configured to support the second fin 68 is positioned in the medial portion of the SUP 40 at the center of inertia of the SUP 42, which is approximately at the center of buoyancy 72 of the SUP 40. For example, as shown in FIG. 5, the user typically stands proximate to the center of buoyancy 72 when paddling the SUP 40. As such, in one embodiment the user is positioned on the first surface 44 opposite the second fin box 66 located on the second surface 60 of the body 42. In an alternate embodiment the second fin box 66 is positioned on the second surface 60 of the body 42 proximate to the nose 48 of the SUP 40. For example, in one embodiment the first and second fin boxes 62, 66 are separated by the maximum distance obtainable on the SUP 40.

Referring again to FIGS. 5-7, the second fin box 66 securing the second fin 68 may be positioned along the longitudinal center line 70 of the SUP 40. Optionally, the position of the second fin box 66 may be displaced from the longitudinal center line 70 of the SUP 40. Optionally, any number of additional fin boxes or fin retaining devices may be positioned anywhere on the second surface 60 of the body 42 of the SUP 40. The second fin box 66, and any additional fin boxes or fin retaining systems located on the SUP 40, may be configured to receive and securely retain at least one second fin 68 therein. Optionally, those skilled in the art will appreciate that the first fin 64, second fin 68, or both may be detachably or non-detachably coupled to the SUP body 42.

In one embodiment, the first fin 64 positioned within the first box 62 is approximately the same size as the second fin 68 positioned within the second fin box 66. For example, in one embodiment at least one of the first and second fins 64, 68 has an elliptical plan shape and an airfoil cross-section. Further, in one embodiment at least one of the first fin 64 has a rake angle of about 15 degrees and an aspect ratio of about 1.75 while the second fin 68 has a rake angle of about 47.5 degrees and an aspect ratio of about 0.70. In an alternate embodiment, the first fin 64 positioned within the first fin box 62 is larger than the second fin 68 positioned in the second fin box 66. For example, in one embodiment the first fin 64 comprises a fin having an elliptical plan shape and an airfoil cross-section. More specifically, the first fin 64 may have an area of about 25 square inches to about 50 square inches. For example, in one embodiment the first fin 64 has an area of about 39 square inches. Further, in one embodiment the first fin 64 has a depth of about 5 to 15 inches. For example, in one specific embodiment, the first fin 64 has a depth of about 9 inches and a root chord of about 5.5 inches, although those skilled in the art will appreciate that the first fin 64 may be manufactured having any root chord desired or any depth desired or any rake angle desired or any aspect ratio desired or any plan shape desired.

Referring again to FIGS. 5-7, the second fin 68 may also have an elliptical plan shape and an airfoil cross section. Further, in one embodiment the second fin 68 has a rake angle between 30 degrees and 50 degrees. In one embodiment, the second fin 68 has a rake angle of about 47.5 degrees and an aspect ratio of about 0.70. More specifically, the second fin 68 may have an area of about 2 square inches to about 50 square inches. For example, in one embodiment the second fin 68 has an area of about 8.25 square inches. Further, in one embodiment the second fin 68 has a depth of about 0.5 to 10 inches. For example, in one specific embodiment, the second fin 68 has a depth of about 2.63 inches and a root chord of about 4.0 inches, although those skilled in the art will appreciate that the second fin 68 may be manufactured having any root chord desired or any depth desired or any rake angle desired or any aspect ratio desired or any plan shape.

In an alternate embodiment, the second fin 68 positioned within the second fin box 66 is larger than the first fin 64 positioned in first fin box 62. Further, those skilled in the art will appreciate that any size, shape, and type of fins may be used as the first fin 64, second fin 68, or both. For example, in one embodiment, the first and second fins 64, 68 have a rake of 45 degrees or more. In another embodiment, the second fin 68 has a rake of greater than 45 degrees while the first fin 64 has a rake angle of less than 45 degrees. In one specific embodiment, the first fin 64 has a rake of about 15 degrees while the second fin 68 has a rake of about 47.5 degrees. Further, in one embodiment, the first fin 64, second fin 68, or both may be non-retractably positioned within the first and second fin boxes 62, 66. In another embodiment, the first fin 64, second fin 68, or both may be selectively retractable from the body 42. Further, the first fin 64, second fin 68, or both may be constructed of any variety of materials, including, without limitations, fiberglass, composite materials, wood fibers, grass fibers (i.e. bamboo, etc.), plastics, polymers, epoxies, natural materials, metals, alloys, and the like.

FIGS. 8-15 show various views of an embodiment of a selectively deployable fin system for use with the SUP described in the previous figures. In addition, those skilled in the art will appreciate that the selectively deployable fin system described herein may be used with any variety of watercraft, including, without limitations, sailboats, catamarans, surfboards, bodyboards, waveskis, kayaks, windsurfing boards, kite boards, waterboards, riverboards, and the like. As shown, the selectively deployable fin system 100 includes at least one housing 102 having at least one actuator 104 formed or otherwise positioned thereon and at least one fin in communication therewith. As shown in FIGS. 8-15, the housing 102 includes at least one flange 110 coupled thereto or formed thereon. At least one housing passage 112 may be formed in the housing 102. During manufacture of the SUP or other watercraft, the housing 102 may be positioned within the body of the watercraft (not shown) such that the housing 102 traverses through the body of the watercraft. As such, the transverse dimensions of the housing 102 or other components of the selectively deployable fin system 100 may be sized accordingly. Further, in one embodiment, the flange 110 formed on the housing 102 may be configured to be flush mounted on at least one surface of a watercraft. In the illustrated embodiment, the flange 110 comprises a generally planar flange member, although those skilled in the art will appreciate that the flange 110 may be arcuate or otherwise configured to generally recreate the profile of the watercraft to which the selectively deployable fin system 100 is mounted.

Figure 8:
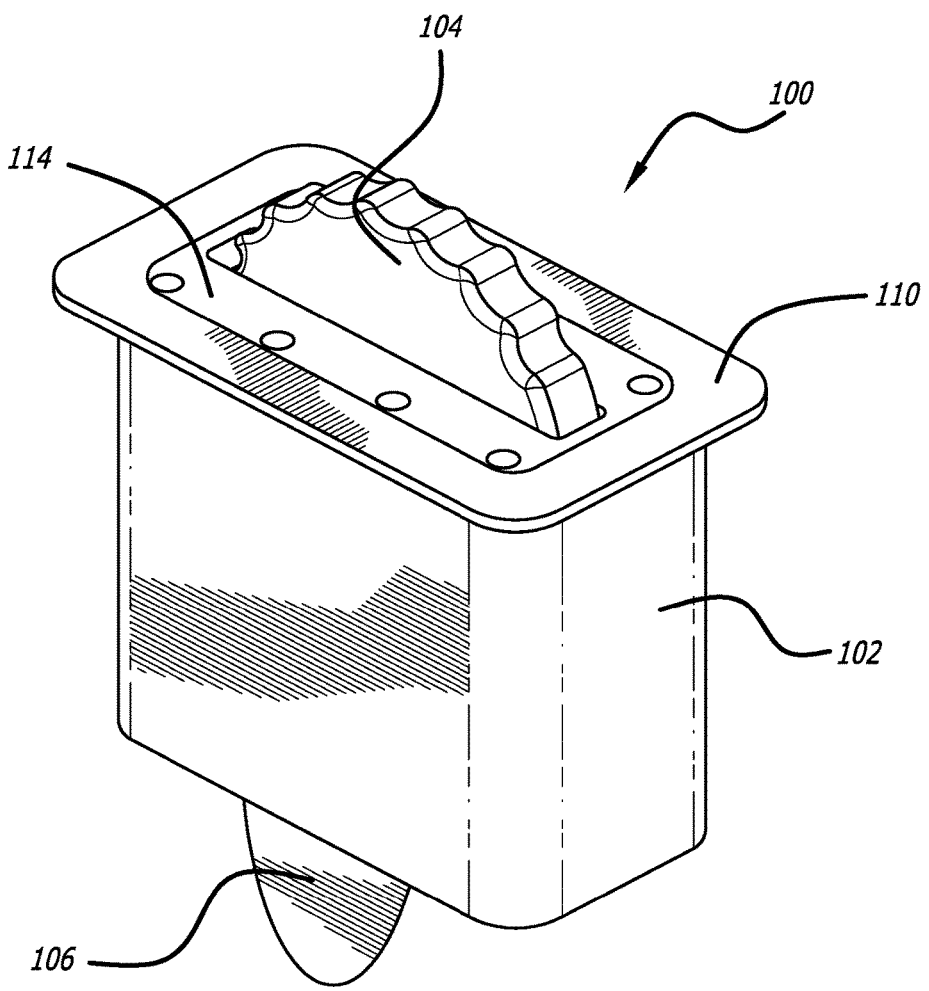
FIG. 8 shows an elevated perspective view of an embodiment of a selectively deployable fin system for use with the SUP shown in FIGS. 5-7.
Figure 9:
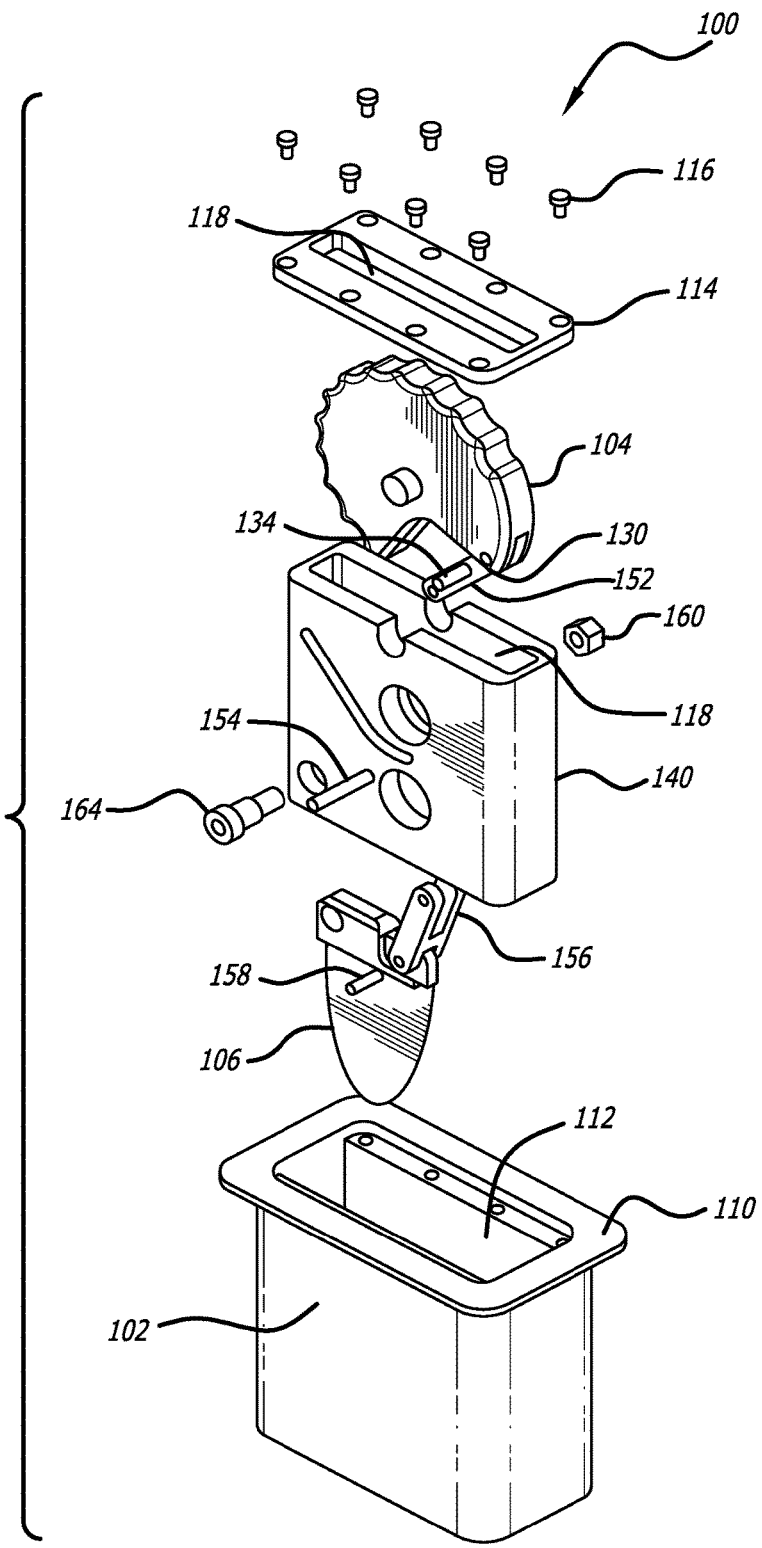
FIG. 9 shows an elevated exploded perspective view of the internal components of an embodiment of a selectively deployable fin system.
Figure 10:
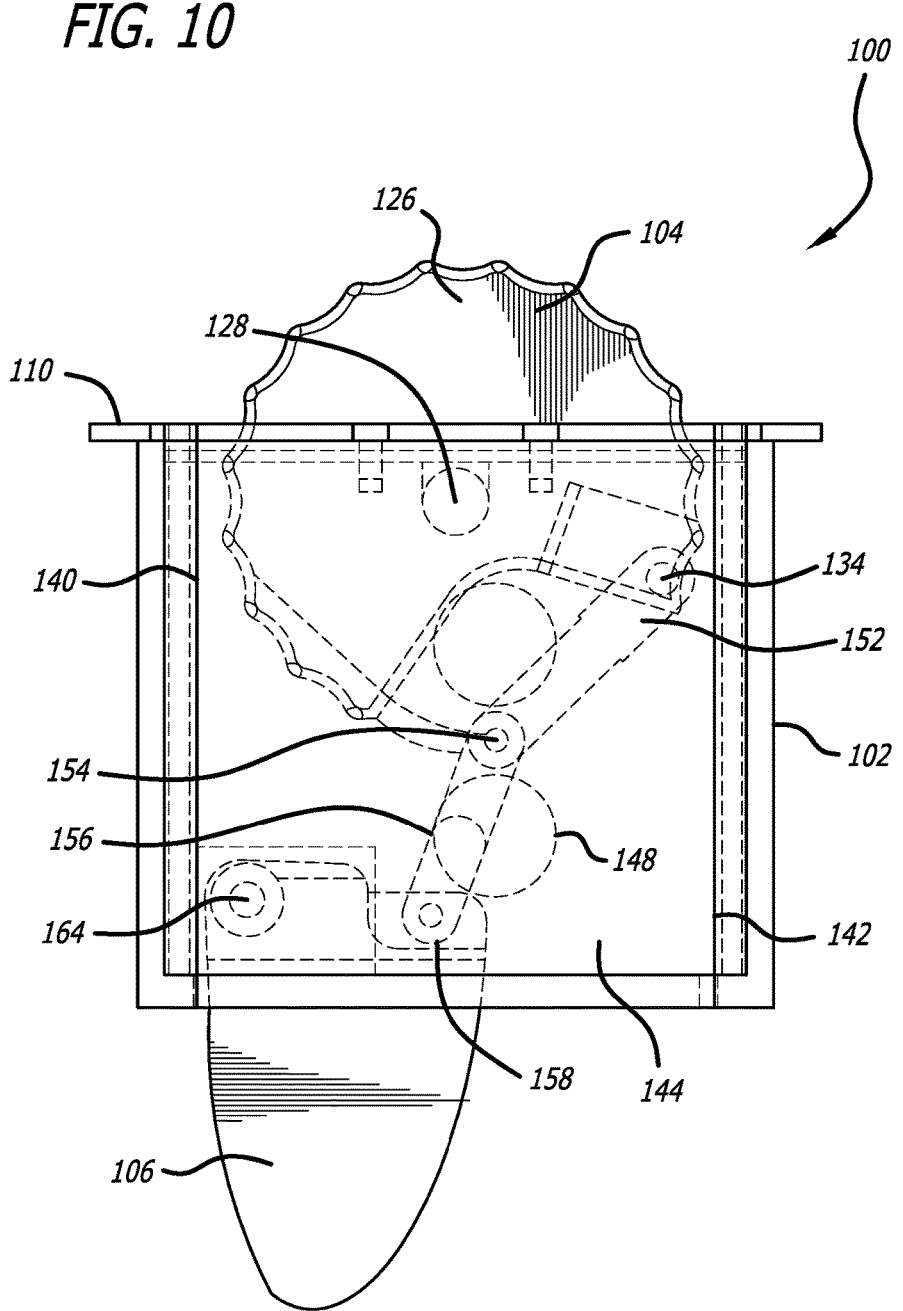
FIG. 10 shows a planar cross-sectional view of the internal components of an embodiment of a selectively deployable fin system.
Figure 11:
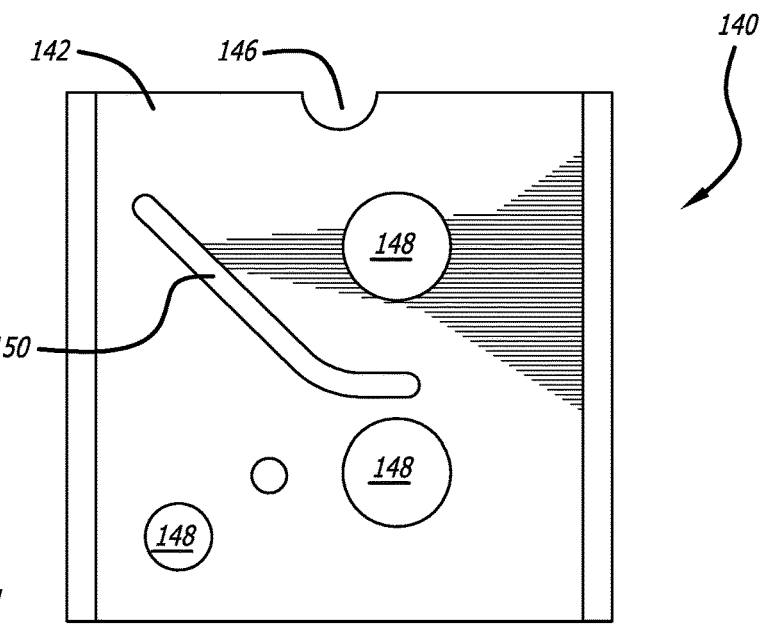
FIG. 11 shows a planar side view of an embodiment of an inner housing assembly of an embodiment of a selectively deployable fin system.

Referring again to FIGS. 8-15, the passage 112 formed in the housing 102 may be sized to receive any number of fin actuation systems or devices therein. Further, as shown in FIGS. 8-10, the housing 102 may be configured to have one or more coverplates 114 affixed to the housing 102. In the illustrated embodiment, the coverplate 114 is detachably coupled to the housing 102 proximate to the flange 110 using one or more fasteners 116. Optionally, the coverplate 114 may be non-detachably coupled to the housing 102. The coverplate 114 may include one or more actuator passages 118 formed therein sized to receive at least a portion of the actuator 104 therethrough.

Figure 12:
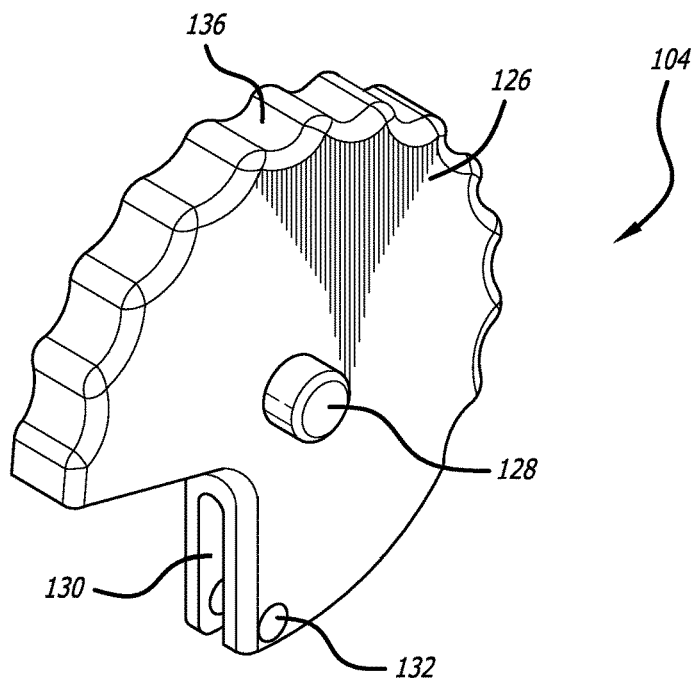
FIG. 12 shows an elevated perspective view of an embodiment of an actuator for use with an embodiment of a selectively deployable fin system.
Figure 13:
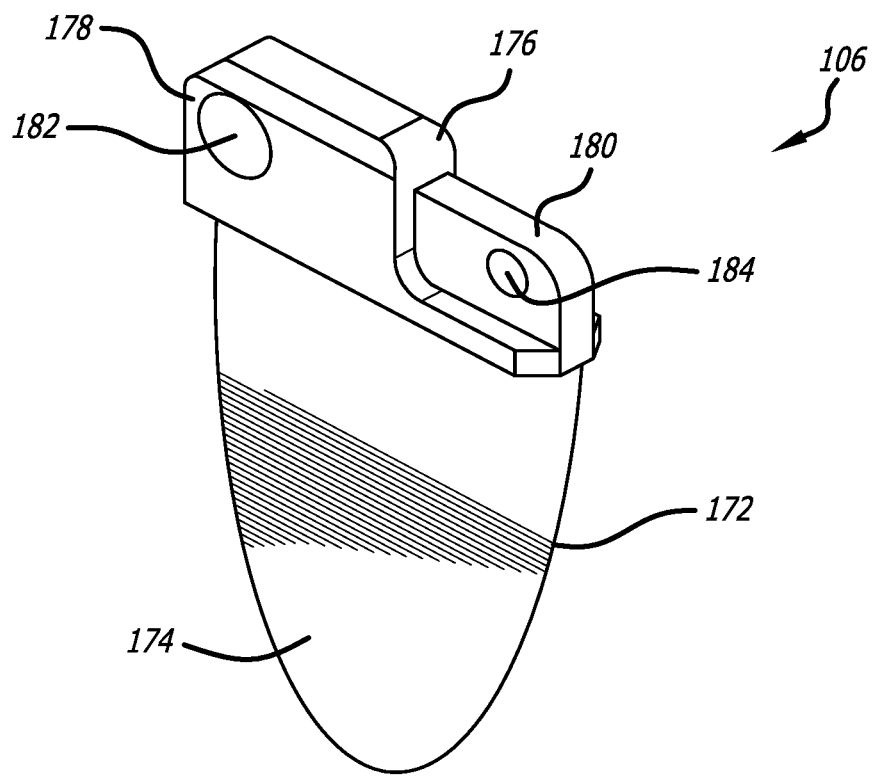
FIG. 13 shows an elevated perspective view of an embodiment of an deployable fin for use with an embodiment of a selectively deployable fin system.

As shown in FIGS. 8-15, the actuator 104 includes at least one actuator body 126 having at least one actuator pin 128 coupled thereto or included thereon. The actuator body 126 may include at least one fin relief 130 having at least one coupler member receiver 132 positioned proximate thereto. The fin relief 130 may be sized to receive at least a portion of at least one fin linkage or transmission device therein. Optionally, the actuator body 126 may include any number of devices or features enabling one or more fins to be coupled thereto. As shown in FIG. 12, the actuator body 126 may include one or more actuation features 136 formed thereon, the actuation features 136 configured to enable the user to simply and effectively manipulate the selectively deployable fin system 100.

Referring again to FIGS. 8-15, in one embodiment, the selectively deployable fin system 100 may include at least one inner housing 140 configured to be positioned within the housing 102. As shown, the inner housing 140 includes at least one inner housing body 142 defining at least one inner housing passage 144. Like the passage 112 formed in the housing 102, the inner housing passage 144 is configured to traverse the body of the watercraft (not shown) to which the selectively deployable fin system 100 is attached. In the illustrated embodiment, a single inner housing passage 144 is formed in the inner housing 140, although those skilled in the art will appreciate that any number of inner housing passages 144 may be formed therein.

As shown in FIGS. 8-15, at least one actuator receiver 146 may be formed on or otherwise the inner housing body 142. The actuator receiver 146 may be sized to receive at least a portion of the actuator body 126 therein. In the illustrated embodiment the actuator receiver 146 is integral to the inner housing body 142. In another embodiment, the actuator receiver 146 may be detachably coupled to the inner housing body 142. Further, the actuator receiver 146 may be positioned at any desired location on the inner housing body 142. In addition, multiple actuator receivers 146 may be positioned on, formed on, or coupled to the inner housing body 142.

Referring again to FIGS. 8-15, the inner housing 140 may include one or more passage, pass-throughs, or similar orifices formed thereon. For example, in the illustrated embodiments, the inner housing 140 includes at least one assembly passages 148 and at least one actuator track 150 formed on the inner housing body 142. Those skilled in the art will appreciate that any number of assembly passages 148 and actuator tracks may be formed on the inner housing body 142. Further, the assembly passages 148 and actuator tracks 150 may be formed in any variety of shapes and sizes.

Referring again to FIGS. 8-15, the selectively deployable fin system 100 may include one or more linkage bodies or transmission devices configured to transmit the force applied to the actuator 104 to the fin 106, thereby permitting the fin to be selectively extended from and retracted into the housing 102. As shown, in one embodiment, the selectively deployable fin system 100 includes at least one actuator linkage body 152 and at least one fin linkage body 156. As such, the actuator linkage body 152 and fin linkage body 156 form a linkage system configured to transmit the movement of the actuator 104 to movement of the fin 106. As shown in FIGS. 9-15, at least a portion of the actuator linkage body 152 is engaged by, coupled to, or otherwise in communication with at least a portion of the fin relief 130 formed on the actuator body 126. For example, in the illustrated embodiment, the actuator linkage body 152 is coupled to the coupling member 134 positioned within the coupling member receiver 132 formed on the actuator body 126. In one embodiment, the coupling member 134 may be integral to the actuator body 126. In another embodiment, the coupling member 134 may be detachable from the actuator body 126.

As shown in FIGS. 9-15, the actuator linkage body 152 may be coupled to the fin linkage body 156 using one or more linkage pins or devices 154. Optionally, the linkage pin 154 may or may not be removable from at least one of the actuator linkage body 152 and the fin linkage body 156.

Further, in one embodiment, the fin linkage body 156 may be coupled to the actuator linkage body 152 in movable relation. Optionally, fin linkage body 156 may be coupled to the actuator linkage body 152 in a fixed relation.

Referring again to FIGS. 8-15, the selectively deployable fin system 100 includes at least one fin 106. The fin 106 includes at least one fin body 172 having fin blade 174 and at least one coupling body 176. In the illustrated embodiment, the coupling body 176 includes at least one fin pivot region 178 and at least one linkage coupling region 180. The fin pivot region 178 may include at least one fin pivot member receiver 182 configured to receive at least one fin pivot member 164 therein. The fin pivot member 164 may be configured to traverse through the inner housing body 140 and the pivot member receiver 182 formed on the fin pivot region 178 and be coupled to at least one nut or fastener receiver 160, thereby coupling the fin 106 to the inner housing body 142 in movable relation. In one embodiment, the fin pivot member 182 may include at least one biasing device or member configured to bias the fin 106 to a retracted configuration wherein the fin 106 is retracted into the housing 102. As such, the user may manipulate the actuator 104 to apply a force to the fin 106 sufficient to overcome the biasing force of the fin pivot member 164, thereby extending the fin 106 from the housing 102. In the alternative, the fin pivot member 182 may include at least one biasing device or member configured to bias the fin 106 to an extended configuration wherein the fin 106 is extended from the housing 102. As such, the user may manipulate the actuator 104 to apply a force to the fin 106 sufficient to overcome the biasing force of the fin pivot member 164, thereby retracting the fin 106 from the housing 102. Optionally, those skilled in the art will appreciate that any variety, type, or configuration of biasing members may be used to bias the fin 106 to a retracted or extended configuration. Further, the fin linkage body 156 may be coupled to the fin 106 using at least one fastener 158 positioned within at least one linkage fastener passage 184 formed on the linkage coupling region 180.

Figure 14:
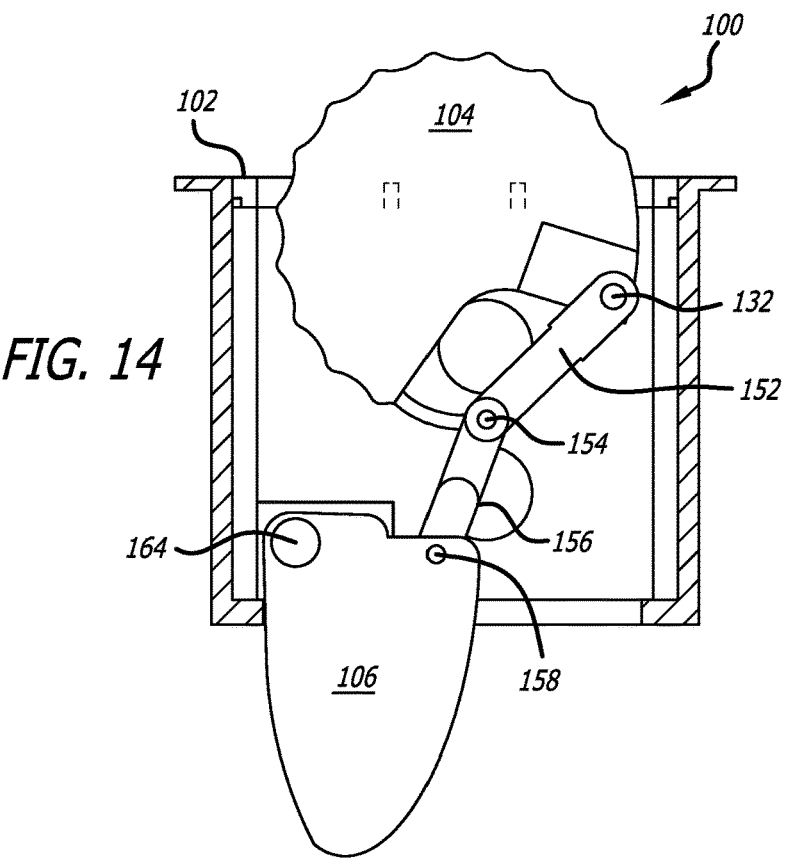
FIG. 14 shows a planar cross-sectional view of an embodiment of a selectively deployable fin system in an extended configuration.
Figure 15:
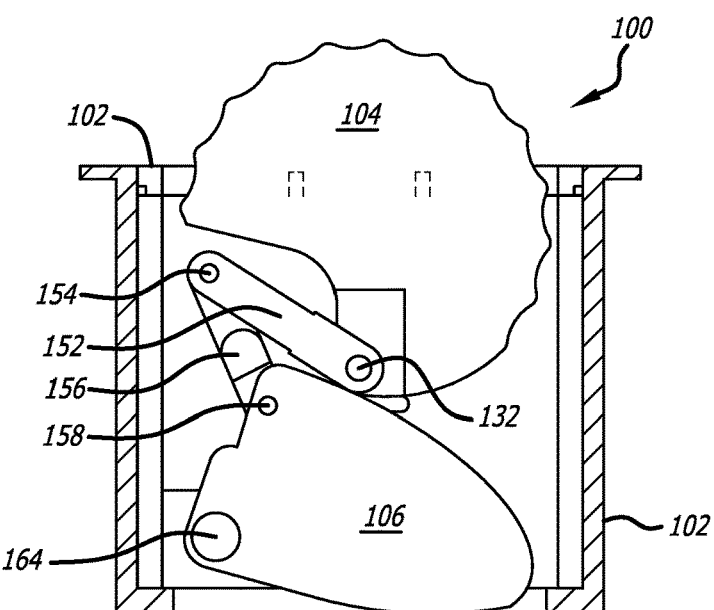
FIG. 15 shows a planar cross-sectional view of an embodiment of a selectively deployable fin system in a retracted configuration.

As shown in FIGS. 8-15, in one embodiment, at least a portion of linkage pin 154 may be positioned within or in communication with the actuator track 150. During use, the linkage pin 154 coupling the actuator linkage body 152 to the fin linkage body 156 translates the rotational movement of the actuator 104 to a linear extending/retracting motion of the fin 106, thereby permitting the fin to be selectively extended from and retracted into the housing 102. More specifically, FIG. 14 shows an embodiment of the selectively deployable fin system 100 in an extended configuration. As shown, the fin 106 is extended from the housing 102. The actuator linkage body 152 and fin linkage body 156 are distally extended. In contrast, FIG. 15 shows an embodiment of the selectively deployable fin system 100 in a retracted configuration wherein the fin 106 is retracted into the housing 102. The actuator linkage body 152 and fin linkage body 156 are located proximally, essentially folded about the linkage pin 154 positioned within the actuation track 150.

Figure 16:
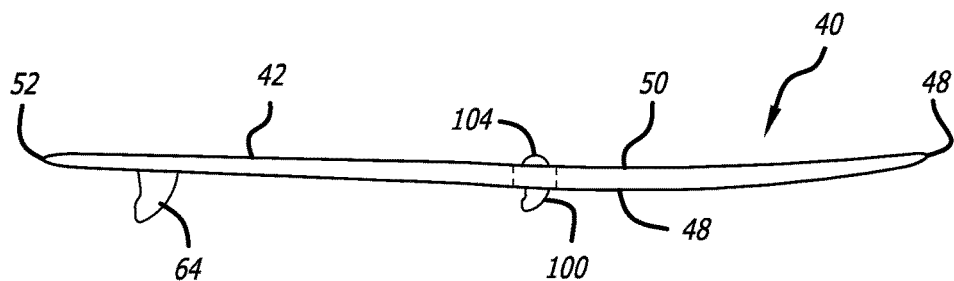
FIG. 16 shows a planar side view of an embodiment of a SUP having improved tracking and stability employing the selectively deployable fin system shown in FIGS. 8-15 in an extended configuration.
Figure 17:
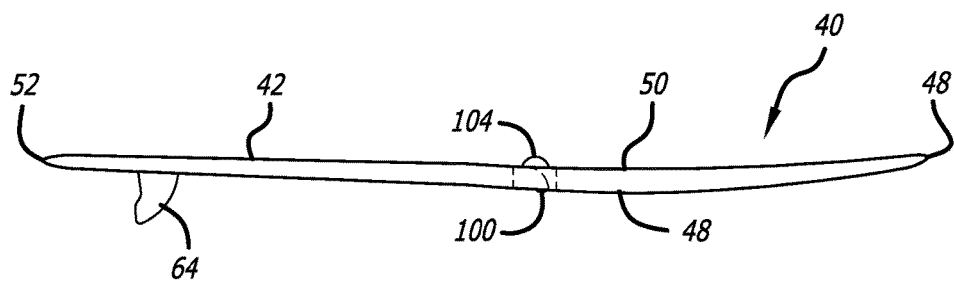
FIG. 17 shows a planar side view of an embodiment of a SUP having improved tracking and stability employing the selectively deployable fin system shown in FIGS. 8-15 in a retracted configuration

FIGS. 16 and 17 show an embodiment of a selectively deployable fin system affixed to an embodiment of the SUP shown in FIGS. 5-7. As described above, the SUP 40 includes a SUP body 42. The body 42 includes a nose 48, a tail 52, and a medial portion 50 positioned between the nose 48 and the tail 52 Further, the SUP 40 includes a first fin 64 positioned proximate to the tail 52.

Referring again to FIGS. 16 and 17 at least one selectively deployable fin system 100 is positioned on the body 42 of the SUP 40. In the illustrated embodiments, the selectively deployable fin system 100 is positioned proximate to the medial portion 50 of the body 42 of the SUP 40. More specifically, FIG. 16 shows the selectively deployable fin system 100 in an extended configuration wherein the fin 106 is extending distally from the housing 102 of the selectively deployable fin system 100 via actuation of the actuator 104. In contrast, FIG. 17 shows the selectively deployable fin system 100 in a retracted configuration wherein the fin 106 is retracted into and positioned within the housing 102 of the selectively deployable fin system 100 via actuation of the actuator 104. As shown in FIG. 17, in one embodiment, the fin 106 may be withdrawn into and housed within the housing positioned within the body 42 of the SUP 40.

The embodiments disclosed herein are illustrative of the principles of the invention. While the description provided above is directed primarily to stand up paddleboard and selectively deployable fin systems for paddleboards, those skilled in the art will appreciate that the various embodiments described herein may be easily adapted for use with surfboards, waveskis, kayaks, bodyboards, waterskis, and similar devices. For example, the selectively retractable fin system described herein may easily be adapted for use with surfboards, waveskis, kayaks, bodyboards, waterskis, and similar devices. Other modifications may be employed which are within the scope of the invention. Accordingly, the devices disclosed in the present application are not limited to that precisely as shown and described herein.

What is claimed is:

1. A selectively deployable fin system for use with a standup paddleboard, comprising:
   at least one housing positioned within a body of a standup paddleboard, the housing defining at least one housing passage therein;
   at least one actuator positioned within the housing, the actuator configured to be operable by a user positioned on the standup paddleboard;
   at least one linkage system in communication with the actuator; and
   at least one fin in communication with the actuator via the linkage system, the fin configured to be selectively positioned within the housing in a retracted configuration, the fin configured to be selectively extending from the housing in a deployed configuration;
   wherein the actuator further comprises a rotatable dial and the linkage system is movable along at least an actuator track, such that a rotational manipulation of the actuator translates to a rotational movement of the linkage system to retract or extend the fin.

2. The selectively deployable fin system of claim 1 further comprising at least one inner housing positioned within the housing passage, the inner housing defining at least one inner housing passage therein.

3. The selectively deployable fin system of claim 2 wherein the actuator, the linkage system, and the fin is movably positioned within the inner housing passage.

4. The selectively deployable fin system of claim 2, wherein the actuator track is formed in the inner housing passage.

5. The selectively deployable fin system of claim 4 wherein the linkage system further comprises:
   at least one actuator linkage body coupled to the actuator;
   at least one fin linkage body coupled to the fin; and
   at least one linkage pin joining the actuator linkage body to the fin linkage body, the linkage pin configured to be retained within and traverse through the actuator track.

6. The selectively deployable fin system of claim 4 wherein the fin further comprises:

at least one fin body defining a fin blade; and at least one coupling body coupled to the fin body, the coupling body defining at least one fin pivot region and at least one linkage coupling region.

7. The selectively deployable fin system of claim 6 wherein the fin pivot region includes at least one fin pivot member receiver formed thereon.

8. The selectively deployable fin system of claim 6 wherein the fin pivot member receiver is configured to receive at least one fin pivot member therein, the fin pivot member configured to couple the fin to at least one of the housing and inner housing in movable relation.

9. The selectively deployable fin system of claim 8 wherein the fin pivot member is configured to apply a biasing force of the fin to configure the fin in an extended configuration.

10. The selectively deployable fin system of claim 8 wherein the fin pivot member is configured to apply a biasing force of the fin to configure the fin in a retracted configuration.

11. The selectively deployable fin system of claim 6 wherein the linkage coupling region includes at least one linkage fastener passages formed therein, the linkage fastener passages configured to receive at least one linkage fastener therein, the linkage fastener configured to couple the fin to a fin linkage body.

12. A selectively deployable fin system for use with a watercraft, comprising:

at least one housing positioned within a body of a watercraft, the housing defining at least one housing passage therein;

at least one actuator positioned within the housing, the actuator configured to be operable by a user positioned on the watercraft;

at least one linkage system in communication with the actuator; and at least one fin in communication with the actuator via the linkage system, the fin configured to be selectively positioned within the housing in a retracted configuration, the fin configured to be selectively extending from the housing in a deployed configuration, wherein the actuator further comprises a rotatable dial and the linkage system is movable along an actuator track, such that a rotational manipulation of the actuator translates to a rotational movement of the linkage system to retract or extend the fin.

13. The selectively deployable fin system of claim 12 further comprising at least one inner housing positioned within the housing passage, the inner housing defining at least one inner housing passage therein.

14. The selectively deployable fin system of claim 13 wherein the actuator, the linkage system, and the fin is movably positioned within the inner housing passage.

15. The selectively deployable fin system of claim 13 further comprising at least one actuator track formed in the inner housing passage.

16. The selectively deployable fin system of claim 15 wherein the linkage system further comprises:

at least one actuator linkage body coupled to the actuator;

at least one fin linkage body coupled to the fin; and at least one linkage pin joining the actuator linkage body to the fin linkage body, the linkage pin configured to be retained within and traverse through the actuator track.

17. The selectively deployable fin system of claim 15 wherein the fin further comprises; at least one fin body defining a fin blade; and at least one coupling body coupled to the fin body, the coupling body defining at least one fin pivot region having at least one fin pivot member receiver formed thereon and at least one linkage coupling region having at least one linkage fastener passages formed therein, the linkage fastener passages configured to receive at least one linkage fastener therein, the linkage fastener configured to couple the fin to a fin linkage body.

18. The selectively deployable fin system of claim 17 wherein the fin pivot member receiver is configured to receive at least one fin pivot member therein, the fin pivot member configured to couple the fin to at least one of the housing and inner housing in movable relation.

19. The selectively deployable fin system of claim 18 wherein the fin pivot member is configured to apply a biasing force of the fin to configure the fin in an extended configuration.

20. The selectively deployable fin system of claim 18, wherein the pivot member is configured to apply a biasing force of the fin to configure the fin in a retracted configuration.

21. The selectively deployable fin system of claim 17, wherein the fin blade further comprises an elliptical plan shape to minimize induced drag force on the fin.

22. The selectively deployable fin system of claim 12 wherein the watercraft comprises at least one watercraft selected from the group consisting of standup paddleboards, paddleboards, sailboats, catamarans, surfboards, bodyboards, waveskis, kayaks, windsurfing boards, kite boards, waterboards, and riverboards.

* * * * *